United States Patent [19]

Freiburger

[11] 3,995,694
[45] Dec. 7, 1976

[54] INFLATABLE WELL SEAL AND METHOD OF USE THEREOF

[76] Inventor: Cletus N. Freiburger, 2820 Davenport St., Dubuque, Iowa 52001

[22] Filed: Nov. 4, 1975

[21] Appl. No.: 628,750

[52] U.S. Cl. .............................. 166/285; 166/187; 137/71
[51] Int. Cl.² ............... E21B 33/13; E21B 33/127; F16K 17/40
[58] Field of Search .......... 166/187, 122, 121, 285, 166/315; 137/68 R, 71

[56] References Cited
UNITED STATES PATENTS

| | | | |
|---|---|---|---|
| 2,605,637 | 8/1952 | Rhoades | 166/187 X |
| 3,493,045 | 2/1970 | Bassani | 166/187 |
| 3,630,214 | 12/1971 | Levering | 137/68 R |

FOREIGN PATENTS OR APPLICATIONS 256,105   1/1965   Australia ........................... 166/187

Primary Examiner—Stephen J. Novosad
Attorney, Agent, or Firm—Browdy & Neimark

[57] ABSTRACT

A method and apparatus for sealing wells utilizing an inflatable bag and an automatically releasable or breakable coupling. An air compressor or other fluid source supplies a fluid to the inflatable bag via a hose connected to the bag by this coupling. The bag is lowered into the well and it is then inflated until a predetermined pressure is reached at which time the coupling releases or ruptures thereby disconnecting the hose from the bag, thus allowing the hose to be recovered and used again. The well is thus sealed by the inflated bag. Concrete or any other similar substance can then be deposited into the well to fill the cavity formed between the bag and the level of the ground. Before the concrete hardens, data such as the date that the well has been sealed can be imbedded into the concrete thereby forming a permanent record of this information. Additionally, a temporary seal can be formed by inflating the bag just below ground level without utilizing the releasable coupling. Once the bag has been inflated to cover the well opening, it is then disconnected from the hose.

11 Claims, 7 Drawing Figures

INFLATABLE WELL SEAL AND METHOD OF USE THEREOF

FIELD OF THE INVENTION

The present invention relates to an apparatus and method for either temporarily or permanently sealing water or other similar wells.

BACKGROUND OF THE INVENTION

In recent years the problem of abandoned wells in many areas of this country, particularly in the Midwest, has increased dramatically. Many years ago a vast majority of the farms in operation in the Midwest were comparatively small, with each farm having its own well to provide for the individual farm's water needs. However, due to the increased cost of farm machinery and other materials which are needed to adequately farm the land, many of these farms have been consolidated into larger and more efficient units. Since in many cases only one water system is needed to operate these larger farms, a large number of wells have become abandoned and due to neglect, have become polluted. If these abandoned wells are not adequately sealed, not only does the water contained therein become polluted, but also these wells pollute the water in adjoining operational wells. The abandoned wells can pollute these operational wells because the wells are usually connected by underground rivers or streams. Therefore, pollutants can enter these subterranean waterways by flowing down the unattended wells thereby polluting the water source used by functional wells in the immediate area.

The present invention can, consequently, have a great impact on the ecology of the land. The underground waters, which are polluted by the spillage into abandoned wells, service countless numbers of irrigation systems. If the water in those systems has been polluted, crops cannot be produced and the soil will be decimated. Furthermore, these underground rivers or streams can empty into above-ground rivers and streams thus polluting these water sources, also.

Due to the great depth of these wells, and the fact that the bottom of the well shaft opens directly into the water source, it would be quite impractical and nearly impossible to merely pour concrete or other hardenable substances into the well shaft to seal the well without first implanting a base structure in the shaft of the well. This structure serves as a support for the hardenable material, and since the base is situated at a reasonably close distance to the top of the well, only a manageable amount of concrete need be used for filling the cavity formed between the base and ground level.

Furthermore, there is a continuing problem, particularly in the Midwest, in which the ravages of flood damage can pollute wells which are still in working order. Heretofore there has not been produced a satisfactory device which would temporarily seal a well until the flood waters have receded and then when the danger of pollution has passed, could be opened again and restored to operation.

Another problem in regard to abandoned wells is the danger of someone accidentally falling into such a well thereby creating a great risk of bodily injury or death.

SUMMARY OF THE INVENTION

It is accordingly an object of the present invention to produce a device which overcomes the defects of the prior art as noted above.

Another object of the present invention is to produce a device that temporarily seals a water well or similar well.

A further object of the present invention is to produce a device which permanently seals an abandoned well.

Another object of the present invention is to produce a device which adequately seals abandoned wells in a simple and economic manner.

A still further object of the present invention is to produce a well-sealing device which utilizes a releasable coupler so that an air hose can be recovered.

A further object of the present invention is to produce a device that seals wells utilizing a releasable coupling element which detaches from a seal when a predetermined pressure has been obtained.

Yet another object of the present invention is to formulate a method for permanently sealing an abandoned well.

Still another object of the present invention is to formulate a method for temporarily sealing operational wells.

These and other objects of the present invention are fulfilled by a simple and easy to use well seal tool utilizing an inflatable bag and an automatically releasable or breakable coupling. An air hose is connected to the bag by way of the coupling, and this air hose is in communication with an air supply means such as an air compressor so that air can be introduced into the bag for purposes of inflation.

When used in abandoned wells, the inflatable bag, coupling and air hose are lowered into the shaft of the well and when inflated, the bag frictionally grips the sides of the well shaft in order to remain in a fixed position in the shaft. When a predetermined pressure is reached in the interior of the bag, the coupling automatically releases or ruptures thereby disconnecting the air hose from the inflatable bag. This enables the air hose and, in the case of a releasable coupling, the coupling to be recovered so that they can be reused to seal additional well shafts.

This device may also be used to temporarily seal a well in a situation in which flood waters could possibly cause pollution in existing wells. In this embodiment, the breakable coupling need not be used and the inflatable bag is lowered to just below the ground level and may be directly connected to the air hose. In this situation, the compressor inflates the bag and when the opening is completely sealed off, it is disconnected from the air hose either automatically or manually. Thus, when the danger of pollution has passed, the tube can be deflated and withdrawn from the well shaft.

BRIEF DESCRIPTION OF THE DRAWING

The foregoing and other objects and benefits of the invention will be described in greater detail below in conjunction with the drawings in which.

DESCRIPTION OF THE PREFERRED EMBODIMENT

Figure 1:
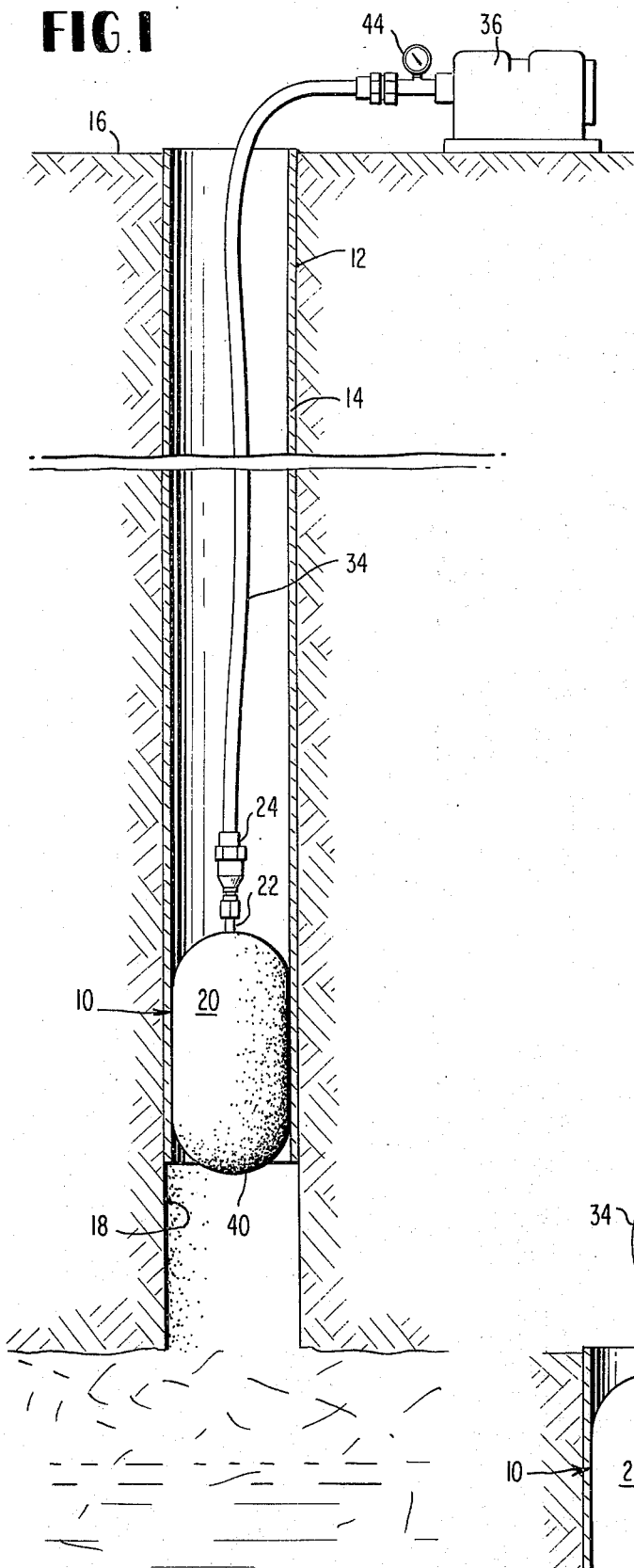
FIG. 1 is a diagrammatical view of the well seal lowered in an abandoned well.
Figure 2:
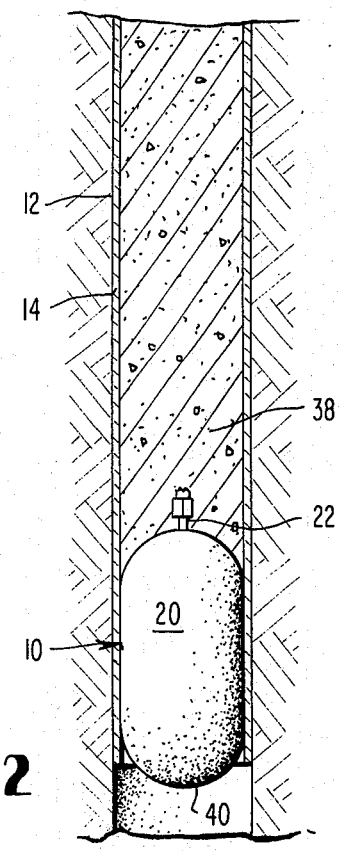
FIG. 2 is a diagrammatical view of the well seal after the air hose has been recovered and cement deposited into the bore.

FIG. 1 shows the well seal apparatus 10 after it has been lowered into an abandoned well shaft 12, inflated to seal the shaft, but before the releasing of the coupling element 24. The apparatus includes an inflatable bag 20 of rubber or other similar elastomeric material which is generally cylindrical in configuration and has a closed lower end 40 and a valve stem 22 similar to a common inner tube valve. Although the exact dimensions of the inflatable bag 20 are not important, it was found that a bag having dimensions of 2 feet in length and 8 inches in diameter performed quite satisfactorily.

Figure 4:
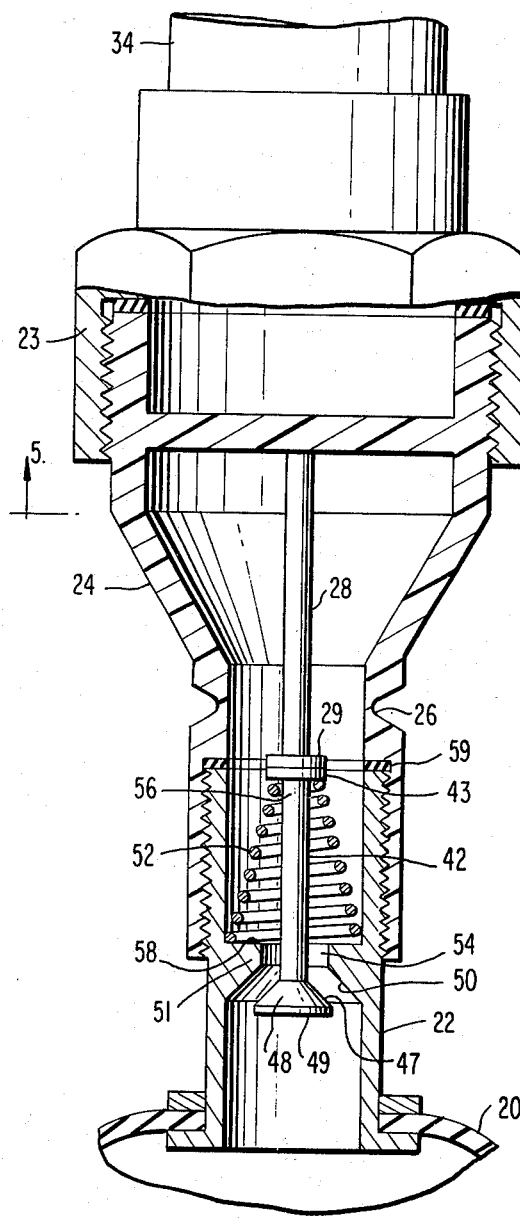
FIG. 4 is a cross-sectional view of the releasable coupling and the valve stem.

One end of an air hose 34 is connected to the valve stem 22 by means of a reducing breakable coupling element 24, and the other end is connected to an air supply means 36 such as a compressor which is positioned at ground level 16 near the well shaft 12. This coupling can be constructed of a plastic material and should be able to withstand between 80 and 125 pounds of air pressure. The coupling shown in FIG. 4 should also be threaded internally at one end to fit a standard pipe thread which is on the outer surface of the valve stem while the outer end of the coupling is preferably threaded on the outside surface to engage the air hose 34 through the use of a standard inwardly threaded coupling element 23 connected to air hose 34. To ensure a tight fit between the stem 22 and the coupling 21, a gasket 59 can be provided. This coupling can be fashioned of a plastic material well known in the art which can be constructed so that it breaks at a predetermined internal pressure of the inflatable bag 20 such as 100 psi. At this pressure, the inflatable bag 20 will completely seal the well shaft. The coupling 24 can be constructed with a shear point area 26 which is of a lesser thickness and encircles the coupling 24 in order to facilitate the occurrence of a concise breakage area on the coupling 24. The coupling 24 contains a plurality of air holes 46 which allow the air to pass from the air hose 34 to the inflatable bag 20, through an orifice 54 located in the inflatable valve stem 22. Coupling 24 also contains a valve pin 28 having a substantially cylindrical head 29, the function of which will be described in detail hereinbelow.

A movable valve pin 42, which may be made of metal, is provided in the valve stem 22 which opens and closes orifice 54 thereby enabling the bag 20 to be filled with air and when coupling 24 breaks, ensuring that air contained in the bag does not escape to the atmosphere but would remain in the bag 20.

The valve pin 42 contains a substantially conical valve head 48 with the base portion 49 facing the interior of inflatable bag 20. The exterior surface 47 of the valve head 48 is adapted to be operatively engaged with a valve seat 50 disposed on an annular flange which encircles the interior of valve stem 22. When the valve head 48 abuts against the valve seat 50, no air can enter or exit from the bag 20, but when the head 48 is not in contact with the seat 50, air may enter the bag 20 through orifice 54.

Valve pin 42 also contains a substantially cylindrical valve head 43 which cooperates with the valve head 29 of valve pin 28. When the coupling 24 is connected to the inflatable bag 20, the valve head 29 of the coupling 24 depresses valve head 43, thereby forcing valve head 48 away from the valve seat 50. A compression spring 52 encircles the upper portion 56 of valve pin 42 between the head 13 of the valve pin 42 contained in valve stem 22 and the top portion 58 of flange 51. Therefore, before valve head 48 can be dislodged from valve seat 50, the force of this spring 52 must be overcome.

Figure 6:
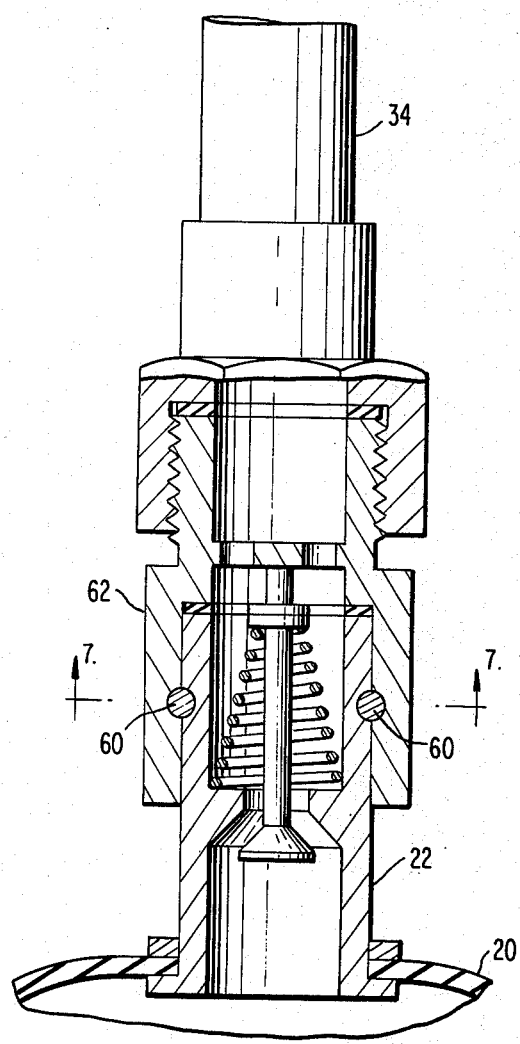
FIG. 6 is a cross-sectional view of another embodiment of the releasable coupling.
Figure 5:
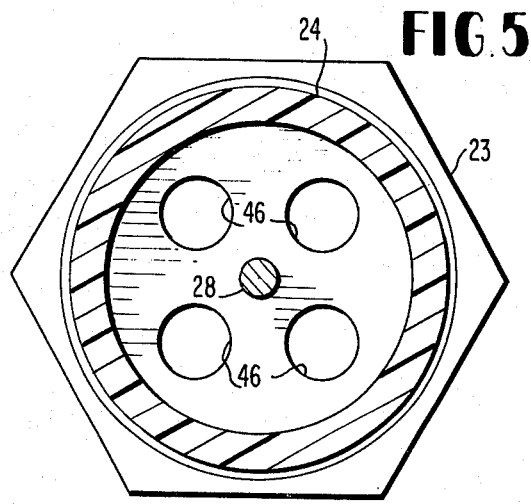
FIG. 5 is a is a sectional view of the releasable coupling taken through 5—5 of FIG. 4.
Figure 7:
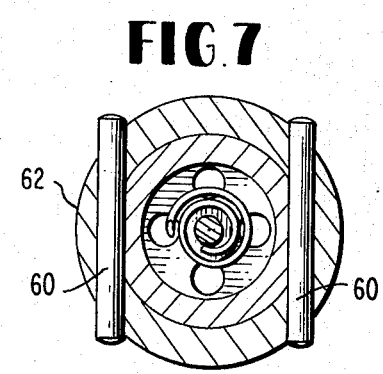
FIG. 7 is a sectional view of the releasable coupling taken through 7—7 of FIG. 6.

FIGS. 6 and 7 depict a second embodiment of an automatically releasable coupling. This coupling 62 has been constructed without the shear point area 26 of coupling 24 but instead utilizing a plurality of shear pins 60. A number of holes, corresponding to the number of shear pins used, are drilled or otherwise fashioned in the valve stem 22 and the coupling 62 so that they align with one another. Therefore, in this embodiment the shear pins 60 provide for the attachment between the valve stem 22 and the coupling 62 and therefore no threading is needed for this connection. The shear pins 60 are then inserted into these holes, thereby joining the stem 22 to the coupling 62. Thereafter, when the entire device is lowered into the well, these pins 60 will rupture when the internal pressure of the inflatable bag 20 reaches a predetermined level thereby releasing the coupling 62 from the stem 22. The use of this type of arrangement enables both the air hose 34 and the coupling 62 to be recovered and reused. It should be noted that an O ring, fiber ring, or shearable ring may be substituted for the shear pin 60 with only slight modification and would perform the same purpose as the pin 60 by allowing separation of the hose 34 from the bag 20 without destruction of the coupling 62.

While the couplings 24 and 62 have been described in great detail in conjunction with a well-sealing device, it should be noted that the use of these couplings 24 and 62 need not be so limited and they could be used to seal any bag or container having a valve stem.

This device operates in the following manner:

Before the inflatable bag 20 is lowered into the well shaft 12, it is connected to the air hose 34 by means of the reducing coupling 24 or 62. The air hose is then connected to the compressor 36 and the entire assembly (except for the compressor 36) is then lowered into the metal casing 14 which is contained in most well shafts, to a point near the bottom thereof.

Next, the air compressor 36 is activated and the bag 20 begins to inflate. It should be noted that an inflatable bag has been used as the well plug since it can inflate to seal wells having many different diameters. When the air pressure inside the bag 20 reaches approximately 100 psi, the plastic coupling 24 breaks and thus the connection between the air hose 34 and the bag 20 is broken at the shear point 26 of the coupling 24. If coupling 62 were used, when this pressure has been obtained, the shear pins 60 will rupture and the coupling 62 will be released from the valve stem 22. This breakage disrupts the engagement between valve heads 29 and 43 thereby allowing the force of spring 52 to force the valve head 48 to abut valve seat 50, thereby sealing the valve stem 22 and ensuring that the air contained in the inflatable bag 20 does not escape. To prevent a malfunction of the system, a gauge 44 can be used in conjunction with the air hose 34 to indicate the pressure therein. If the pressure exceeds 100 psi and the coupling has not broken, then the compressor can be manually shut off.

After the coupling 24 or 62 has separated from the stem 22, the air hose 34 is then removed, leaving the inflatable bag 20 in situ wedged against the metal casing 14 of the well shaft 12. A hardening substance such as concrete, mixed clay or similar composition 38 is then poured into the well shaft 12 until the ground level 16 has been reached. This concrete permanently closes the well and also alleviates the danger of a person or an animal inadvertently stumbling into an uncovered, unattended abandoned sealed well. The concrete may also cover the area immediately surrounding the well opening thus ensuring a more permanent closure. Additionally, information such as the date that the well has been sealed can be applied into the concrete forming a permanent record of this data.

Figure 3:
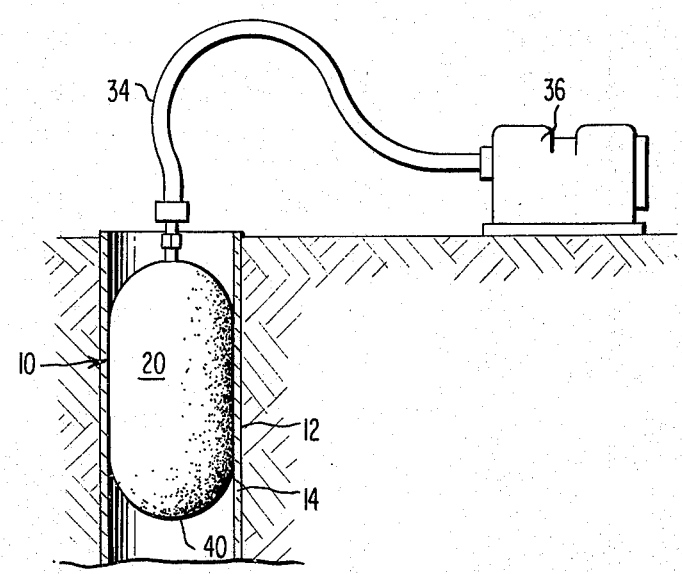
FIG. 3 is a diagrammatical view of the well seal lowered for temporary sealing.

FIG. 3 shows a slightly different embodiment of this invention when it is used to temporarily seal an operating well in order to prevent contaminated water from flowing therein, e.g. in case of a flood. As shown in this Figure, the inflatable bag 20 may be connected to the air hose 34 using any appropriate reducing coupling. The bag is lowered until it is only slightly below the ground level and then inflated by use of the air compressor 36. When the bag has been inflated so as to seal the shaft opening, the air hose 34 is disconnected leaving a well having a temporary seal therein. When the flood waters have subsided, the bag 20 is deflated and then removed entirely from the well shaft 12.

Although the present invention has been described in great detail, it will be understood that the embodiments of this invention are shown only for the purpose of illustration and are not to be considered to limit the invention to strictly what is described in the specification and shown in the drawings. For example, for the sake of clarity, it has been stated that the inflatable bag 20 is filled with air produced by an air compressor 36. However, it should be appreciated that any suitable fluid such as water could be used for this purpose along with any suitable supply means. Additionally, the present invention is not to be construed to be limited to sealing only water wells. Rather, this device may be utilized in sealing other types of wells or conduits having a substantially circular cross-section.

What is claimed is:

1. An apparatus for forming a seal within the wall of a well bore which comprises:
    an expansible hollow member,
    a normally closed valve attached to one end of said expansible member,
    a coupling releasably mounted on said valve and having means provided therein to hold the valve in an open position,
    said coupling including means for automatically disengaging said coupling from said valve when a predetermined fluid pressure is accumulated in said expansible member, and
    means for conducting a fluid under pressure to the expansible member to expand said member against the wall of the well bore, whereby when the fluid pressure within said member reaches a predetermined value, the coupling will automatically disconnect from the expansible member and leave the inflated member as a seal within said well bore.

2. Apparatus according to claim 1 wherein said coupling is encircled by a shear point area of lesser thickness, thereby facilitating the breaking of said coupling at said predetermined value.

3. Apparatus according to claim 1 wherein said coupling contains at least one shear pin connecting said coupling to said expansible member said shear pin being adapted to rupture at said predetermined value of pressure to facilitate the release of said coupling from said valve.

4. Apparatus according to claim 1 wherein said coupling is constructed of a plastic material adapted to break at said predetermined value.

5. Apparatus according to claim 1 wherein said expansible member has a valve stem attached thereto, said valve being located in said valve stem, said coupling having means thereon for connection to said valve stem;
    depressing means in said coupling for depressing said valve to open the container; and
    releasable means provided in said coupling adapted for automatic release when the fluid pressure of said container reaches a predetermined level, thereby removing said depressing means from contact with said valve releasing said valve to close said container.

6. Apparatus according to claim 5 wherein said valve means includes a movable valve pin having first and second heads thereon, and an annular valve seat encircling the interior of said valve stem, wherein said first head is adapted to engage said valve seat, and wherein said depressing means is a valve pin adapted to engage said second head of said movable valve pin, thereby moving said first head from said valve seat.

7. Apparatus according to claim 6 further including a spring encircling said movable valve pin in the area between said valve seat and said second head adapted to force said first head into engagement with said seat.

8. Apparatus according to claim 5 wherein said releasable means is constructed of a plastic material adapted to break at said predetermined value of pressure to facilitate the release of said coupling from said valve.

9. Apparatus according to claim 5 wherein said releasable means comprises a thinner portion in the wall of said coupling adapted to break at said predetermined value.

10. Apparatus according to claim 5 wherein said releasable means comprises at least one shear pin adapted to shear at said predetermined value.

11. A method of sealing a well comprising the steps of:
    connecting a fluid hose between an inflatable bag and a fluid supply apparatus, the connection between said inflatable bag and said fluid hose being accomplished by means of a releasable coupling;
    lowering said inflatable bag into the well to a depth sufficient for sealing the well;
    inflating said inflatable bag until said releasable coupling releases due to the internal pressure therein, thereby disconnecting said fluid hose from said inflatable bag;
    removing said fluid hose from the well while maintaining said bag in an inflated condition for sealing said well; and
    depositing a hardenable material into the well to fill the cavity formed between said inflated bag and ground level.

* * * * *